July 15, 1941.  H. J. GOODMAN  2,249,356
SELF-LOADING DUMP TRUCK
Filed March 4, 1940  3 Sheets-Sheet 1
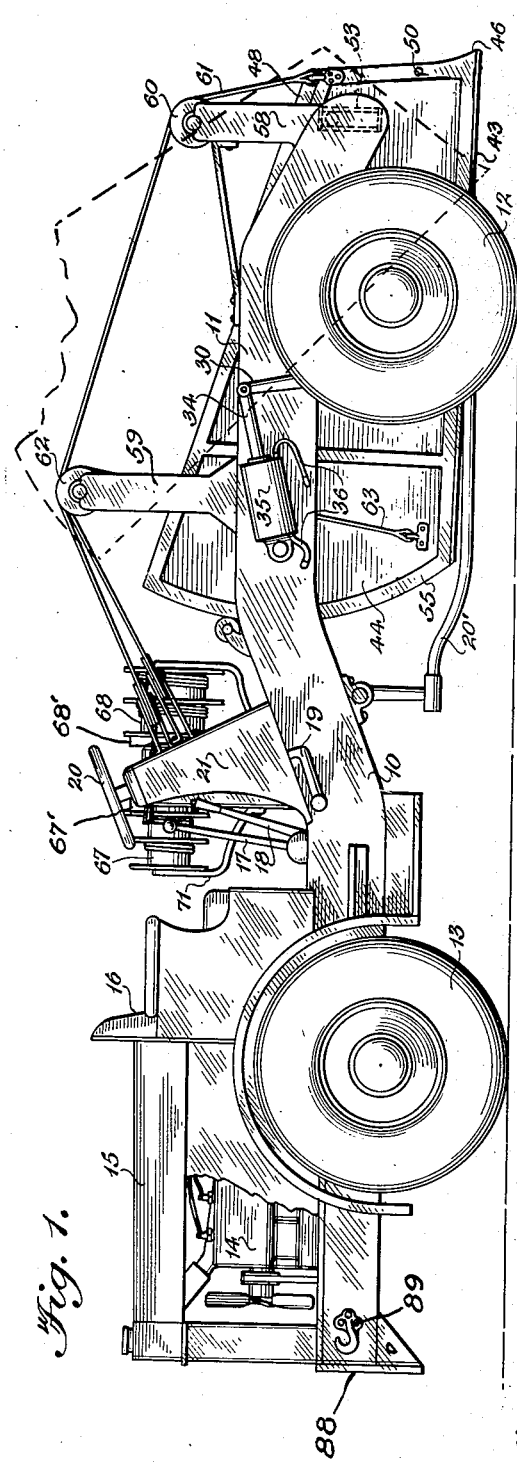
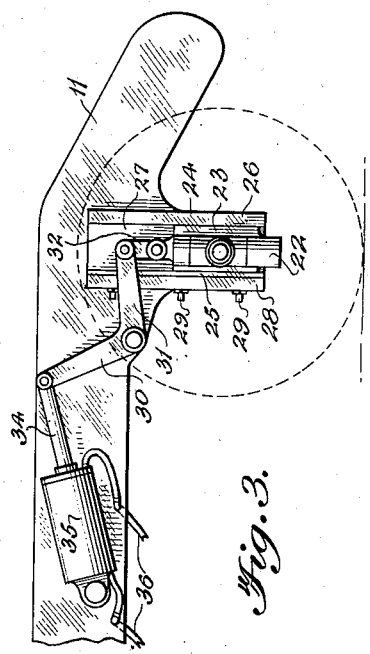
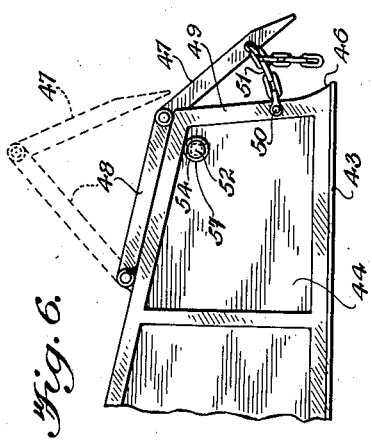
Inventor
H. J. Goodman,
By Christian R. Nielsen
Attorney July 15, 1941.   H. J. GOODMAN   2,249,356
SELF-LOADING DUMP TRUCK
Filed March 4, 1940   3 Sheets-Sheet 2

Inventor
H. J. Goodman,
By Christian R. Nielsen
Attorney

July 15, 1941.  H. J. GOODMAN  2,249,356
SELF-LOADING DUMP TRUCK
Filed March 4, 1940  3 Sheets-Sheet 3

Inventor
H. J. Goodman,
By Christian R. Nielsen
Attorney

Patented July 15, 1941

2,249,356

UNITED STATES PATENT OFFICE 2,249,356

SELF-LOADING DUMP TRUCK

Harvey J. Goodman, Lakeside, Calif.

Application March 4, 1940, Serial No. 322,245

3 Claims. (Cl. 37—126)

The invention relates to excavating, loading and hauling machinery, and has for an object to present a self-loading truck having novel features of construction and also novel functions of special value in a self-loading truck, as well as in uses for excavating and earth moving, grading, and spreading of materials.

It is a special aim of the invention to present such a truck adapted to be constructed as a self-propelled vehicle, in which a single operator may control all operations of the machine, and wherein the operator will have clear view of the work of the machine while loading or excavating, and also of the highway when transporting excavated or otherwise loaded materials.

It is an important object of the invention to present a truck of the general character indicated which may be used also as a "bull dozer" when desired, and without removal of parts or replacements, may be used to load material and haul the same, at will.

An important aim of the invention is to present a novel operating means and controls for effecting the positioning of the load-receiving body of the machine, to the end that it may be used as a shovel type self-loader, and for elevating and for dumping the body. Another important object is to present a novel construction in a load carrying truck body adapting it to the special uses indicated. Another important aim is to present a novel mounting of a truck body for the uses indicated. A special object is to present novel construction for elevating the load.

A still further aim is to present a novel truck running gear construction for trucks of the general character described. Yet another purpose is to present a novel operating means for mechanical parts of such a machine.

Additional objects, include simplification and ease of control of the various functions of the machine.

These and additional objects, advantages and features of invention reside in the construction, arrangement and combination of parts involved in the embodiment of the invention, as will be understood from the following description and accompanying drawings, wherein Figure 1 is a side view of a machine embodying my invention.

Figure 3 is a detail of the individual front wheel mounting.

Figure 6 is a fragmentary side view of the body, showing operation of the gate.

Figure 2:
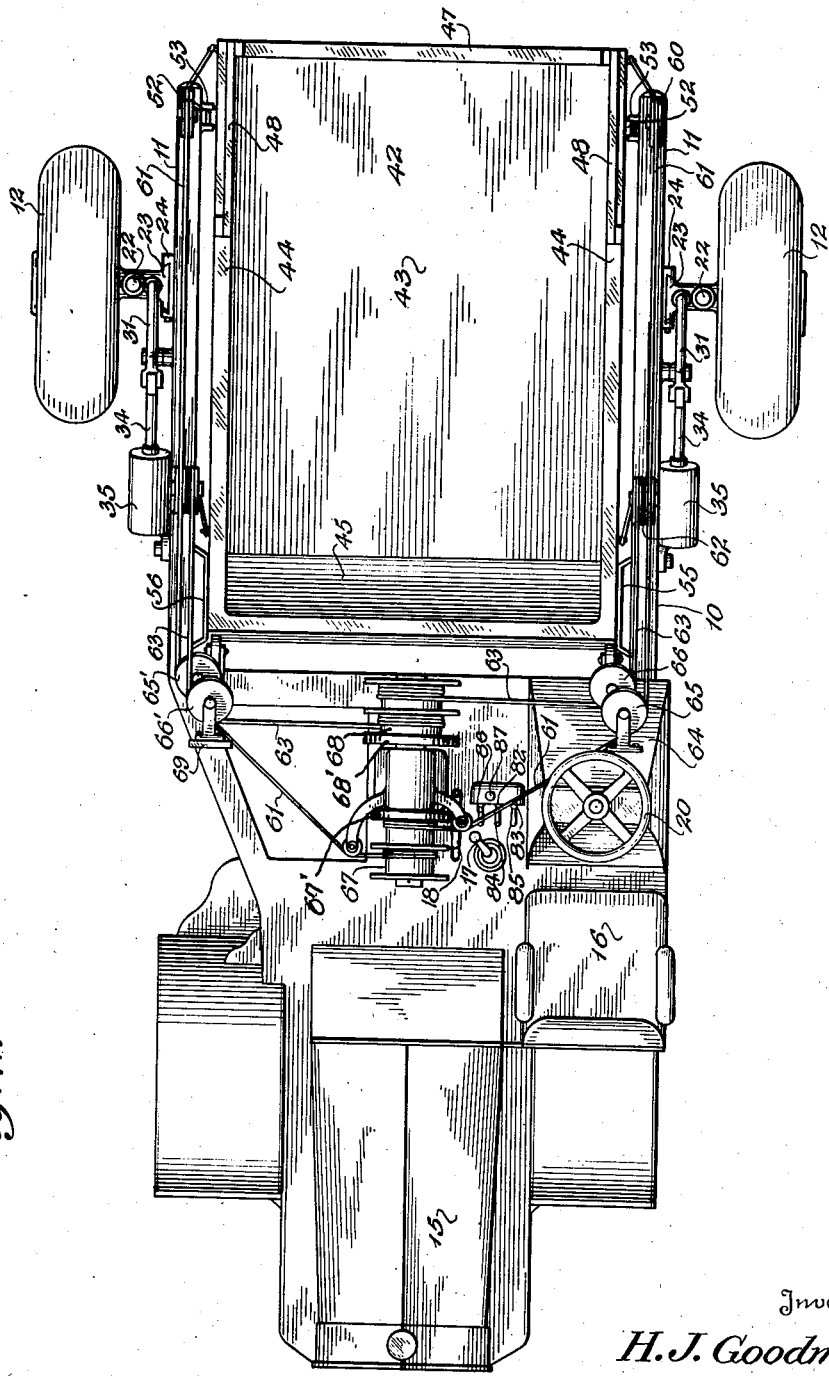
Figure 2 is a top view thereof.
Figure 4:
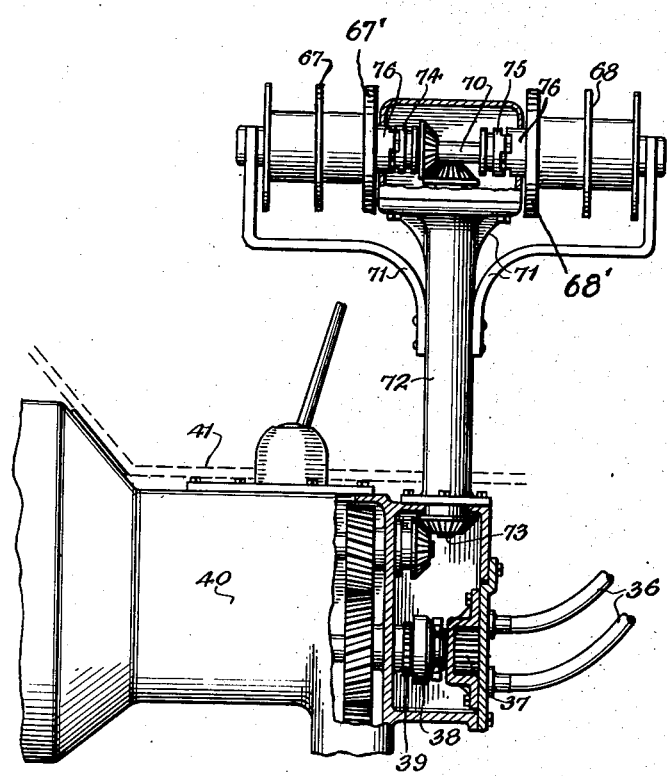
Figure 4 is a detail sectional view of the body hoisting cable drums and transmission.
Figure 5:
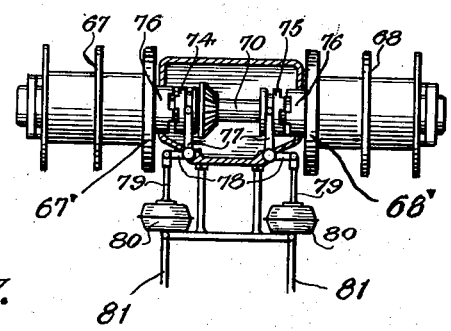
Figure 5 is a top view of the last mentioned cable drums and gear shift devices.
Figure 7:
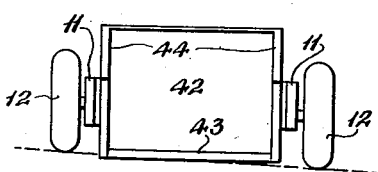
Figure 7 is a diagrammatic front view illustrating one of the positions which the carrying body may assume.

There is illustrated a truck which includes a chassis frame 10, of suitable heavy construction, including two side members 11, projecting forwardly in parallel spaced relation and without a cross beam or connecting axle at the extreme forward part, but having steering wheels 12 mounted thereon, as will be described. Rearwardly the frame is narrowed somewhat and mounted on drive wheels 13 of conventional construction and mounting. A motor 14 of any approved kind is mounted under the hood 15 on the narrowed rear frame, which projects a distance rearwardly beyond the wheels, as shown. Any desired operative connections may be made between the motor and wheels 13, details thereof not being illustrated since they comprise no novel part of my invention. Immediately forward of the motor at the right-hand side, a driver's seat 16 is provided, and in front of this conventional driving gear control lever 17 and brake lever 18, clutch pedal 19 or other desired controls are provided. A steering wheel 20 is mounted on a pier structure 21, from which connections 20' are made with the wheels 12, the details of which connections are not shown as they may include conventional worm and sector or other motion reducing gear, and such linkage connections as required. The wheels include steering knuckles 22 respectively pivoted on vertically slidable cross head blocks 23 carried in vertical guides 24 securely bolted or otherwise fastened to the outer sides of the side members 11. These guides each includes two side rails 25—26 and a bed plate 27, and the rail 25 is adjustably carried by studs in a guide frame piece 28, adjustment of the rail being effected by suitable screws 29 engaged in the frame piece.

The wheels 12 are adjustable vertically with respect to the frame 10 by means of heavy bell cranks 30 mounted on the side members 11 rearwardly of the guides 24, one forwardly extending arm 31 of each crank being connected by a suitable link 32 to the adjacent cross head block, while an upwardly extending arm 33 of the bell crank is connected to the piston rod 34 of an expansible chamber servo motor 35 including a cylinder pivoted or otherwise mounted suitably on the side of the member 11 of the frame 10.

Fluid under pressure, preferably a hydraulic fluid, may be supplied to one end and vented from the other end of this cylinder by conventional tube connections 36 from the outlet and inlet ports respectively of a gear pump or other pump at 37, controlled by a sliding gear 38 shifting of which is effected by any usual conventional means, the sliding gear meshing with a gear 39 fixed on a stud shaft projected forwardly from the transmission 40, shown formally beneath the floor 41 of the vehicle, and which may be of any approved type and construction of which many are available suitable for the uses contemplated. Fluid need only be supplied by power at the pump to move the blocks 23 downward, return being effected by the weight of the frame 10, etc. Obviously, the servo motors 35 may be independently operated through the valve 86, if and as desired.

A load-receiving and carrying body 42 is provided, preferably steel, with suitable stiffening framing, this body including a floor 43, two sides 44, and a rear wall 45. The front edge of the floor may be reinforced by a heavy excavating shoe 46 or other excavating devices commonly used. The body sides may be made higher at the rear part and the rear wall equally high or higher, if desired. The front end of the body is without any fixed wall but is open between the side walls over the floor. A gate 47 is provided, adapted to sit between the sides 44 for vertical sliding movement, and has pivoted on its upper part at each side an arm 48, extended forwardly and pivoted on the side wall 44, so that the gate may be lifted to the raised position shown at Figure 6, and may drop to closed position freely. The sides of the body are provided with respective standards 49 and in their lower parts pins 50 are provided adapted to be projected through suitable apertures in the gate and hold it from swinging rearwardly. The arms 48 are so located that when the gate is fully lowered they rest on the respective sides of the body supporting the gate pivotally. The pin may be withdrawn to permit the gate to swing rearwardly, and a chain 51 connected between the gate and pin to limit swinging movement of the gate so that it may be used to limit the rate of discharge of contents from the body, and so the truck may be utilized as a spreader of various materials. The forward part of the body 42 is provided with heavy supporting and longitudinal push-sustaining trunnions 52, vertically slidable in vertical reinforced slots 53 in the forward extremities of the side members 11, which are projected some distance in front of the wheels 12. These trunnions may have head collars 54 suitably flanged fixed on their outer ends, so that the ends of the side members 11 will be thereby held in firm fixed spaced relation, and in proper relation to the body 42. The rear sides of the body 42 may have wear plates 55 included on their outer faces, and on the inner sides of the chassis the frame members 11, buffer members 56 are fixed adapted to receive the plates 55 freely slidable vertically therebetween, the rear part of the body thus being kept from swinging laterally in the truck frame. The trunnions 52 may also have wide shoulder portions at 57 engaging the inner sides of the side members 11 to aid the collars 54 in keeping the front end of the body properly positioned between the side members 11.

The front and rear ends of the truck body are vertically movable independently or together by means now to be described. Standards 58 are fixed on the forward ends of the side members 11 of the truck frame, suitably stiffened or braced, and standards 59 are similarly mounted on the members 11 a little forward of the rear end of the body 42, so that the upper ends of these standards are near or beside the position of the lower rear part of the body when it is elevated while the trunnions 52 rest in the lower parts of the slots 53. Respective vertical pulleys 60 are mounted at the upper ends of the front standards over which suitable cables 61 are extended from the upper forward corners of the body 42 and extended upwardly and rearwardly over the pulleys 62.

The pier structure 21 is located to one side of the medial vertical longitudinal plane of the vehicle, and on its front side there are mounted inclined pulleys 65 and 66 spaced longitudinally of the vehicle and at slightly different levels. The right hand front cable 61 is extended rearwardly from the front standard 58 over the outer part of the double pulley 62 to the outer side of the pulley 65, and then inwardly around the latter pulley to a hoisting drum 67 having a divided reel. The rear cable 63 is extended from the double pulley around the pulley 66 and inwardly to a similar reel of a separate drum 68. At the opposite side of the vehicle the cables 61 and 63 are similarly extended rearwardly and inwardly around pulleys 65' and 66' mounted on a supporting standard 69 at the left hand side of the truck chassis frame. These cables are attached to the opposite sides of the respective drums 67 and 68, so that the two cables 61 will be simultaneously wound by the drum 67 on rotation in one direction, and the cables 63 will be wound on the drum 68 simultaneously, or unwound according to the direction of rotation of the drum. These drums require to be independently operated at times, and at other times may be operated in unison, so as to lift either the front or the rear of the body 42, or both sets may be operated together to elevate the body 42, translatively, as required. In addition, suitable brakes 67' and 68' are employed to effectively control the action of the drums, and consequently the position of the bed 42. The drums are mounted on respective ends of a revoluble shaft 70 carried by brackets 71 projected in opposite directions from a central vertical column 72 mounted in front of the transmission 40 Through this column a vertical drive shaft 73 is extended, driven constantly from the transmission 40 by a suitable gear train.

At the upper end of the column a bevel gear drive is incorporated between the two shafts so that the shaft 70 is also constantly rotated Slidably splined on the shaft 70 adjacent the inner end of each drum, there is a clutch member 74 and 75 respectively, and on the adjacent ends of the drums there are coacting clutch portions 76 so that on movement of the respective clutch member 74 to engaging position the drum 67 will be rotated, and on operation of the clutch member 75 the drum 68 will be operated These clutch members are each independently operated by means of a respective usual gimbal ring and forked lever 77, the latter being on arm of a bell crank lever 78, the other arm o which is connected by link 79 to a respectiv vacuum motor device 80, the two being connected by branched pipe 81 to the inlet manifol of the motor 14 or other readily controlled op erating means employed. At present valves 8 and 83 are incorporated respectively in the branches of the pipe 81. These valves may be located conveniently to the operator's seat 16 and include levers 84—85 respectively, deflection of which by the finger of the operator will cause operation of the respective servo motors 80 and the clutches, as required. A third similar lever 86 is provided closely adjacent the others, suitably connected to the sliding gear of the pump so that the elevation and lowering of the forward part of the truck frame on the wheels 12 may be controlled.

It will be understood that the description and representation herein of the hoisting devices for the body 42 and the elevating and lowering means for the wheels 12, as well as other mechanical features of the invention, is purely exemplary and formal, and that variation, additional inclusions, substitutions and changes in the construction, arrangement and combination of the parts may be made without departing from the spirit of the invention as more particularly set forth in the appended claims.

In the operation of my invention, the motor 14 being in operation, the driver and operator may take his place on the seat 16 for the purpose of driving the machine along a roadway, operating the body hoisting or dumping means, and for loading the body. The operating of the machine as a vehicle will be carried out in accordance with practices involved with the particular type of motor and transmission gearing employed, and corresponds to familiar practice generally in operation of self-propelled vehicles.

For loading the body 42, the truck is driven forwardly toward the material to be loaded, which it is assumed is either loose earth or the like in situ or heaped material. As the truck reaches the area to be excavated, while the truck continues its forward progress at proper speed, the drums 67—68 are operated so as to lower the rear of the body to a position where it may either rest on the ground surface or slightly thereabove, according to the nature of the work, and the front end is lowered to a position at the ground surface, ordinarily for heaped material, or allowed to fall below the normal ground surface if the material is in situ, so that it operates somewhat like a mechanical shovel. As the shoe 46 is pressed into the material, the material thereover is caused to move backward into the body 42 by reaction of the material still in front of the shoe. In material extending upwardly a considerable distance above the level of initial engagement of the shoe 46, as, a bank of unexcavated earth, or a pile of material, the front edge of the body may be hoisted as the machine progresses after initial engagement with the material, while the rear end is allowed to remain at its low position. Also in excavating spread material such as earth in situ, the machine may be stopped in its forward progress from time to time, while the front end of the body is elevated to its maximum, causing the material accumulated in the body to slide rearwardly, thus clearing the way for entry of more material when the body is lowered to loading position again and the vehicle again moved forward. When a satisfactory amount of material has thus been caused to enter the body 42, and it is desired to transport the load to a distant point, the hoists are both operated so as to lift both the front and rear ends of the body 42. In the excavating or loading operations described, a contribution to the effectiveness of the operation may be made by operating the motor 35 or valve 86 so as to allow the wheels to rise beside the frame members 11, lowering the latter together with the body 42, so that excavation may be effected below the track of the wheels, if necessary.

The lowering of the front end of the body 42 is limited by the trunnions 52 engaging the lower ends of the slots 53, and when the frame is at its intermediate or normal position on the wheels 12, and the trunnions 52 are at the lower ends of the slots, the truck bottom will be approximately at the level of the tracks of the wheels, by which is meant the lower side of the periphery of the wheel tire. Rubber or other tires may be employed on the wheels 12 and 13. When the body 42 is hoisted while the wheels are in intermediate position the body may have the relative position shown in full lines in Figure 2. This will afford sufficient clearance for movements over roadways, but should more clearance be required the body may be hoisted farther, or the wheel mountings may be depressed further on the side members 11.

In order to dump the load from the body 42, the front end of the body is lowered until the trunnion 52 rests at the lower end of the slot 53, and the rear of the body lifted to its extreme, as dotted at B in Figure 2. In many loading and dumping operations the use of the gate 47 will not be required and it may be omitted, if desired. When retained, it is elevated to the extreme position and secured while the self-loading operations described are carried out, and any time that it is required as a closure, it may be lowered and secured in front of the pin 50, and when the load is to be discharged the pin may be removed without raising the gate on the arms 48 and the load allowed to push the gate open. Or, the gate may be secured in partly open position by the chain 51 as in Figure 6, and the device utilized as a spreading unloader.

The rear of the frame 10 is provided with a bumper 88 against which another vehicle or tractor may engage to push my truck in order to give additional forward propulsion thereto when required, and a towing hook 89 is also provided thereadjacent.

In the use of the device as a bull dozer, the gate is lowered and kept closed, while the body 42 is lowered to track level, and the machine then put in gear to move forward and push whatever material may be in its path.

The body 42 may be loaded by steam or other mechanical shovels either with or without its self-loading operation as described.

It is a special advantage of the truck that it may be driven close to a dump shelf or edge with a minimum liability of going beyond safe positions, because of the projection of the body at full dumping position.

It should be understood that the slot 53 may be extended upwardly much further than illustrated, if desired, and may be even extended in the forward standard 60 as in Figure 1, enabling greater lift of the front body part.

It should be appreciated that the frame members 11 are supported at their inner sides by the push-sustaining trunnions 52 in such manner that the severe pressure against the outer side of the gate incident to "bull dozing" will be adequately opposed. The bull dozing operation is often desirable as a preliminary to loading of the body 42, because in excavation work it is often desired to leave a well graded surface before all loose material is removed, and if loading were proceeded with exclusively in the use of my truck, low areas could not be filled without an unloading operation and spreading of the material in the low area with hand tools or other machines, whereas, by combining the bull dozing and self-loading functions, a complete and proper finishing of an operation may be effected without calling for other equipment or labor.

I claim:

1. A machine of the character described comprising a wheeled frame substantially U-shaped and open at the front end, a load receiving body set between the side members of the frame having an open forward end, and pivoted at its front end on the front ends of the frame, said pivot including a vertically movable connection with the frame, means to hoist and lower the front end of the body at will, separate means to independently hoist and lower the rear end of the body at will, said frame including a wheel at each side of the open front end, and means to move the forward ends of the frame vertically with respect to the axes of the last named wheels.

2. A machine of the character described comprising a wheel frame substantially U-shaped and open at the front end, a receiving body set between the side members of the frame having an open forward end, and pivoted at its front end on the front ends of the frame, said pivot including a vertically movable connection with the frame, means to hoist and lower the front end of the body at will, separate means to independently hoist and lower the rear end of the body at will, said frame including side members, two of the wheels being mounted at the front parts of the side members, said mounting including a vertical guideway, a cross block slidable therein, a servo motor, operative connections between the motor and said cross head, the respective wheel being pivoted on said cross head for steering action, and manual means to control the servo motor.

3. A machine of the character described comprising a wheel frame substantially U-shaped and open at the front end, a load receiving body set between the side members of the frame having an open forward end, and pivoted at its front end on the front ends of the frame, said pivot including a vertically movable connection with the frame, means to hoist and lower the front end of the body at will, separate means to independently hoist and lower the rear end of the body at will, said frame including side members, two of the wheels being mounted thereon respectively, said mounting including a vertical guideway fixed on the frame, a wheel carrier slidable therein, a wheel knuckle pivoted thereon, the wheel being revolubly mounted on the knuckle, steering connections with the knuckle, an expansible chamber motor mounted on the frame, operative connections between the motor and said wheel carrier to move the carrier downward on admission of pressure fluid to the motor, and means manually controlled to supply operating fluid to said motor.

HARVEY J. GOODMAN.